United States Patent
Har-Noy et al.

(10) Patent No.: US 8,542,736 B2
(45) Date of Patent: Sep. 24, 2013

(54) METHOD AND APPARATUS FOR VIDEO CODING USING PREDICTION DATA REFINEMENT

(75) Inventors: Shay Har-Noy, La Jolla, CA (US); Oscar Divorra Escoda, Princeton, NJ (US); Peng Yin, West Windsor, NJ (US); Cristina Gomila, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 612 days.

(21) Appl. No.: 12/311,036

(22) PCT Filed: Oct. 11, 2007

(86) PCT No.: PCT/US2007/021811
§ 371 (c)(1),
(2), (4) Date: Mar. 16, 2009

(87) PCT Pub. No.: WO2008/048489
PCT Pub. Date: Apr. 24, 2008

(65) Prior Publication Data
US 2009/0238276 A1    Sep. 24, 2009

Related U.S. Application Data

(60) Provisional application No. 60/852,529, filed on Oct. 18, 2006, provisional application No. 60/911,536, filed on Apr. 13, 2007.

(51) Int. Cl.
*H04N 7/12*      (2006.01)
*H04N 11/02*     (2006.01)
*H04N 11/04*     (2006.01)

(52) U.S. Cl.
USPC ............ 375/240.12; 375/240.13; 375/240.14; 375/240.15; 375/240.29; 348/394.1; 348/409.1; 348/411.1; 348/412.1; 348/415.1; 382/238; 382/261; 382/268

(58) Field of Classification Search
USPC ......................... 382/260–265, 232, 233–253; 375/240.01–240.29; 348/384.1, 385.1–399.1, 348/400.1–440.1
See application file for complete search history.

(56) References Cited

U.S. PATENT DOCUMENTS

| | | | |
|---|---|---|---|
| 6,041,145 | A | 3/2000 | Hayashi et al. |
| 6,272,177 | B1 | 8/2001 | Murakami et al. |

(Continued)

FOREIGN PATENT DOCUMENTS

| | | |
|---|---|---|
| JP | 5-219498 A2 | 8/1993 |
| JP | 6-311506 | 11/1994 |

(Continued)

OTHER PUBLICATIONS

A Nonlinear Loop Filter for Quantization Noise Removal in Hybrid Video Compression, Onur G. Guleryuz, 2005 IEEE.*

(Continued)

*Primary Examiner* — Sath V Perungavoor
*Assistant Examiner* — Nathnael Aynalem
(74) *Attorney, Agent, or Firm* — Robert D. Shedd; Guy H. Eriksen

(57) ABSTRACT

There are provided methods and apparatus for video coding using prediction data refinement. An apparatus includes an encoder for encoding an image region of a picture. The encoder has a prediction refinement filter for refining at least one of an intra prediction and an inter prediction for the image region. The prediction refinement filter refines the inter prediction for the image region using at least one of previously decoded data and previously encoded data, the previously decoded data and the previously encoded data corresponding to pixel values in neighboring regions with respect to the image region.

30 Claims, 8 Drawing Sheets

(56) References Cited

U.S. PATENT DOCUMENTS

| | | | |
|---|---|---|---|
| 6,853,752 B2* | 2/2005 | Tan et al. | 382/236 |
| 6,993,195 B2* | 1/2006 | Olivieri | 382/232 |
| 7,145,953 B2* | 12/2006 | Park et al. | 375/240.2 |
| 7,245,659 B2 | 7/2007 | Sekiguchi et al. | |
| 7,379,501 B2* | 5/2008 | Lainema | 375/240.29 |
| 7,391,812 B2* | 6/2008 | Pun et al. | 375/240.29 |
| 7,548,659 B2* | 6/2009 | Ofek et al. | 382/254 |
| 7,747,094 B2* | 6/2010 | Sekiguchi et al. | 382/239 |
| 8,189,934 B2 | 5/2012 | Wittmann et al. | |
| 2003/0039310 A1* | 2/2003 | Wu et al. | 375/240.16 |
| 2003/0152146 A1* | 8/2003 | Lin et al. | 375/240.16 |
| 2004/0008782 A1* | 1/2004 | Boyce et al. | 375/240.16 |
| 2006/0209952 A1* | 9/2006 | Tanizawa et al. | 375/240.03 |
| 2006/0285757 A1* | 12/2006 | Abe et al. | 382/236 |
| 2007/0110152 A1* | 5/2007 | Lee et al. | 375/240.03 |
| 2007/0217508 A1* | 9/2007 | Shimada et al. | 375/240.03 |
| 2008/0037656 A1* | 2/2008 | Hannuksela | 375/240.26 |
| 2008/0066407 A1 | 3/2008 | Son et al. | |
| 2008/0069247 A1* | 3/2008 | He | 375/240.29 |
| 2010/0008592 A1* | 1/2010 | Boon et al. | 382/238 |

FOREIGN PATENT DOCUMENTS

| | | |
|---|---|---|
| JP | 9-187008 | 7/1997 |
| JP | 2002-315004 | 10/2002 |
| JP | 2008-506873 | 3/2008 |
| WO | 03/003749 A1 | 1/2003 |
| WO | 2006/076602 A1 | 7/2006 |
| WO | 2007/111292 A1 | 10/2007 |

OTHER PUBLICATIONS

Guleryuz, O.G.: "A Nonlinear Loop Filter for Quantization Noise Removal in Hybrid Video Compression" Image Processing, 2005. ICIP 2005. IEEE International Conference on Genova, Italy Sep. 11-14, 2005, Piscataway, NJ, USA, IEEE, vol. 2, Sep. 11, 2005. pp. 1-4, XP002398390 ISBN: 978-0-7803-9134-5 the whole document.

Shay Har-Noy et al: "Adaptive In-Loop Prediction Refinement for Video Coding" Multimedia Signal Processing, 2007. MMSP 2007. IEEE $9^{TH}$ Workshop on, IEEE, PI, Oct. 1, 2007, pp. 171-174, XP031197804 ISBN: 978-1-4244-1273-0978 the whole document.

Rane, Shantanu D et al : "Structure and Texture Filling-in of Missing Image Blocks in Wireless Transmission and Compression Applications" IEEE Transactions on Image Processing, vol. 12, No. 3, Mar. 2003 pp. 296-303.

Guleryuz, O.G.: Nonlinear Approximation Based Image Recovery Using Adaptive Sparse Reconstructions and Iterated Denoising—Part I: Theory IEEE Transactions on Image Processing, vol. 15, No. 3, Mar. 2006 pp. 539-554.

Guleryuz, O.G.: Nonlinear Approximation Based Image Recovery Using Adaptive Sparse Reconstructions and Iterated Denoising—Part II: Adaptive Algorithms pp. 1-26.

Bertalmio Marcelo et al: "Simultaneous Structure and Texture Image Inpainting" IEEE Transactions on Image Processing, vol. 12, No. 8, Aug. 2003 pp. 882-889.

ITU-T Telecommunication Standardization Sector of ITU H.264 Series H:Audiovisual and Multimedia Systems Infrastructure of audiovisual services—Coding of moving video Advanced video coding for generic audiovisual services Mar. 2005.

Search Report dated Mar. 16, 2008.

\* cited by examiner

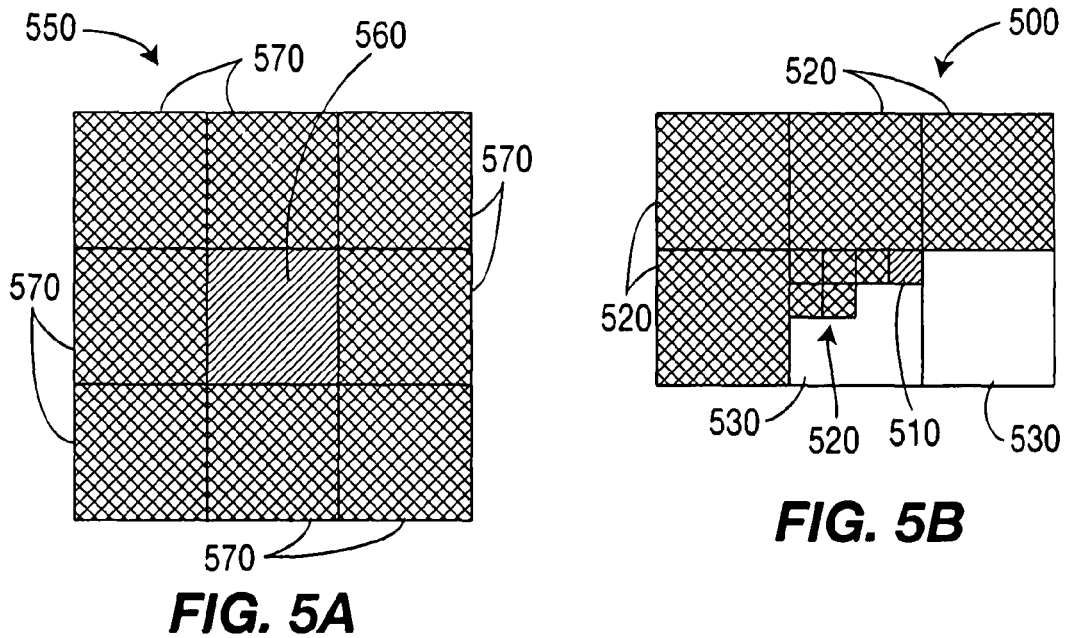
FIG. 5A  FIG. 5B
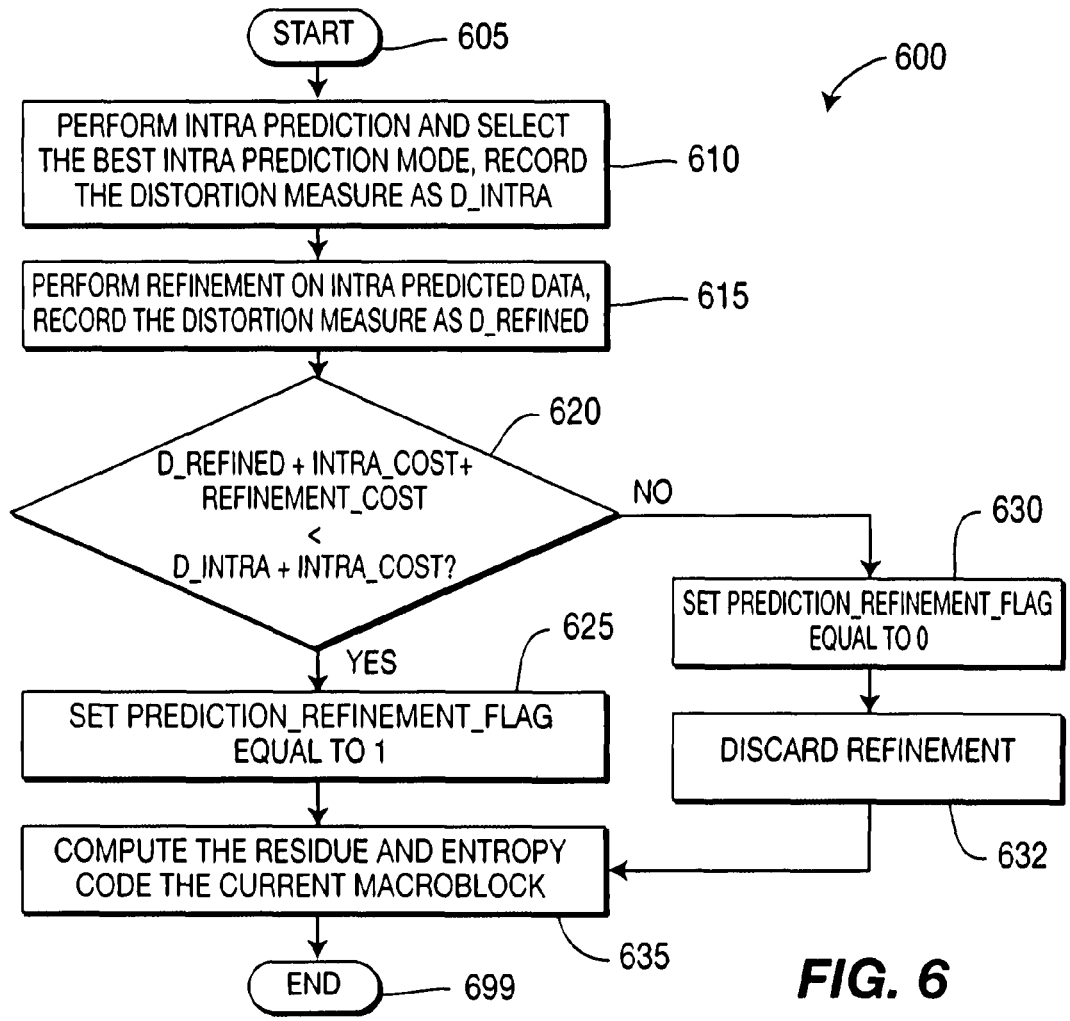
FIG. 6

METHOD AND APPARATUS FOR VIDEO CODING USING PREDICTION DATA REFINEMENT

CROSS-REFERENCE TO RELATED APPLICATIONS

This application claims the benefit, under 35 U.S.C. §365 of International Application PCT/US2007/21811, filed Oct. 11, 2007 which was published in accordance with PCT Article 21(2) on Apr. 24, 2008 in English and which claims the benefit of U.S. provisional patent application No. 60/852,529 filed Oct. 18, 2006 and provisional application 60/911,536 filed Apr. 13, 2007.

TECHNICAL FIELD

The present principles relate generally to video encoding and decoding and, more particularly, to methods and apparatus for video coding using prediction data refinement.

BACKGROUND

Video coding techniques may use prediction based coding in order to be efficient. Data at a given frame is predicted, on a block basis, from already decoded data, which can either be from other reference frames (i.e., "inter" prediction), or from the already decoded data at the same frame (i.e., "intra" prediction). The residual error, generated after prediction is subtracted from the original data, is then typically transformed, quantized, and encoded. The type of prediction used at a given spatial location of a given frame is adaptively selected such that final coding is as efficient as possible. This selection relies on the optimization of a rate-distortion measure. Indeed, the predictor leading to the lowest distortion with the lowest bitrate is typically selected among all possible prediction modes.

In some cases, the best predictor in terms of rate distortion may not give accurate predicted data, generating, then, a high amount of residual error that has to be coded. Inaccuracy may be due to the rate constraint which leads the predictor selection to a compromise between bitrate cost and distortion or simply because available prediction models aren't appropriate. Intra prediction in the International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 recommendation (hereinafter the "MPEG-4 AVC standard" is an example where a low-pass operator is used to predict the data in a given block using information from its decoded neighboring blocks. However, such predictors are unable to handle high frequencies and textured data.

In some state of the art video encoders/decoders such as, for example, those in compliance with the MPEG-4 AVC Standard, prediction refinement by the use of the so-called "deblocking filter" is utilized within the coding/decoding process. Coding inaccuracies, introduced by transform-based coding of the residual error, may be reduced by means of a filter that operates on reconstructed frames as a last step in the coding loop. Other in-loop filters have been proposed in order to overcome the limitations of the MPEG-4 AVC Standard deblocking filter. Typically, these filters are applied on the reconstructed pictures.

In-loop filtering after reconstruction allows for the recovery of part of the information lost during the quantization step in error residual coding. However, it is not expected to help reduce the amount of information to be encoded in the current picture, as it is applied on reconstructed images. In order to reduce the amount of information to be encoded, the prediction signal can be improved. Traditionally, this has been done by the inclusion of increasingly more sophisticated prediction modes.

Algorithms for the estimation of missing data, some of which may be referred to as "inpainting" algorithms, may be based on, for example, diffusion principles and/or texture growing, or nonlinear sparse decompositions de-noising. These algorithms may try to estimate the values of missing data based on known neighboring data. Indeed, one could imagine having a missing block within a picture, and recovering the missing block by estimating the missing block from the data available in some neighboring block. These algorithms generally assume there is no knowledge about the data missing, i.e., they only rely upon the neighboring available data to estimate the missing data.

Turning to FIG. 1, a video encoder capable of performing video encoding in accordance with the MPEG-4 AVC standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. An output of reference picture buffer 180 is connected in signal communication with a third input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and with an inverting input of the combiner 185.

Inputs of the frame ordering buffer 110 and the encoder controller 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Turning to FIG. 2, a video decoder capable of performing video decoding in accordance with the MPEG-4 AVC standard is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

SUMMARY

These and other drawbacks and disadvantages of the prior art are addressed by the present principles, which are directed to methods and apparatus for video coding using prediction data refinement.

According to an aspect of the present principles, there is provided an apparatus. The apparatus includes an encoder for encoding an image region of a picture. The encoder has a prediction refinement filter for refining at least one of an intra prediction and an inter prediction for the image region. The prediction refinement filter refines the inter prediction for the image region using at least one of previously decoded data and previously encoded data, the previously decoded data and the previously encoded data corresponding to pixel values in neighboring regions with respect to the image region.

According to another aspect of the present principles, there is provided a method. The method includes encoding an image region of a picture using a prediction refinement filter to refine at least one of an intra prediction and an inter prediction for the image region. The prediction refinement filter refines the inter prediction for the image region using at least one of previously decoded data and previously encoded data, the previously decoded data and the previously encoded data corresponding to pixel values in neighboring regions with respect to the image region.

According to yet another aspect of the present principles, there is provided an apparatus. The apparatus includes a decoder for decoding an image region of a picture. The decoder has a prediction refinement filter for refining at least one of an intra prediction and an inter prediction for the image region. The prediction refinement filter refines the inter prediction for the image region using previously decoded data corresponding to pixel values in neighboring regions with respect to the image region.

According to a further aspect of the present principles, there is provided a method. The method includes decoding an image region of a picture using a prediction refinement filter to refine at least one of an intra prediction and an inter prediction for the image region. The prediction refinement filter refines the inter prediction for the image region using previously decoded data corresponding to pixel values in neighboring regions with respect to the image region.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5A shows a diagram for a current intra 4×4 block being coded and the relevant causal neighborhood used as a reference for prediction refinement, according to an embodiment of the present principles;

FIG. 5B shows a diagram for a current intra 4×4 block being coded and the relevant non-causal neighborhood used as a reference for prediction refinement, according to an embodiment of the present principles;

FIG. 6 shows a flow diagram for a method for encoding image data using prediction refinement, according to an embodiment of the present principles;

DETAILED DESCRIPTION

Figure 1:
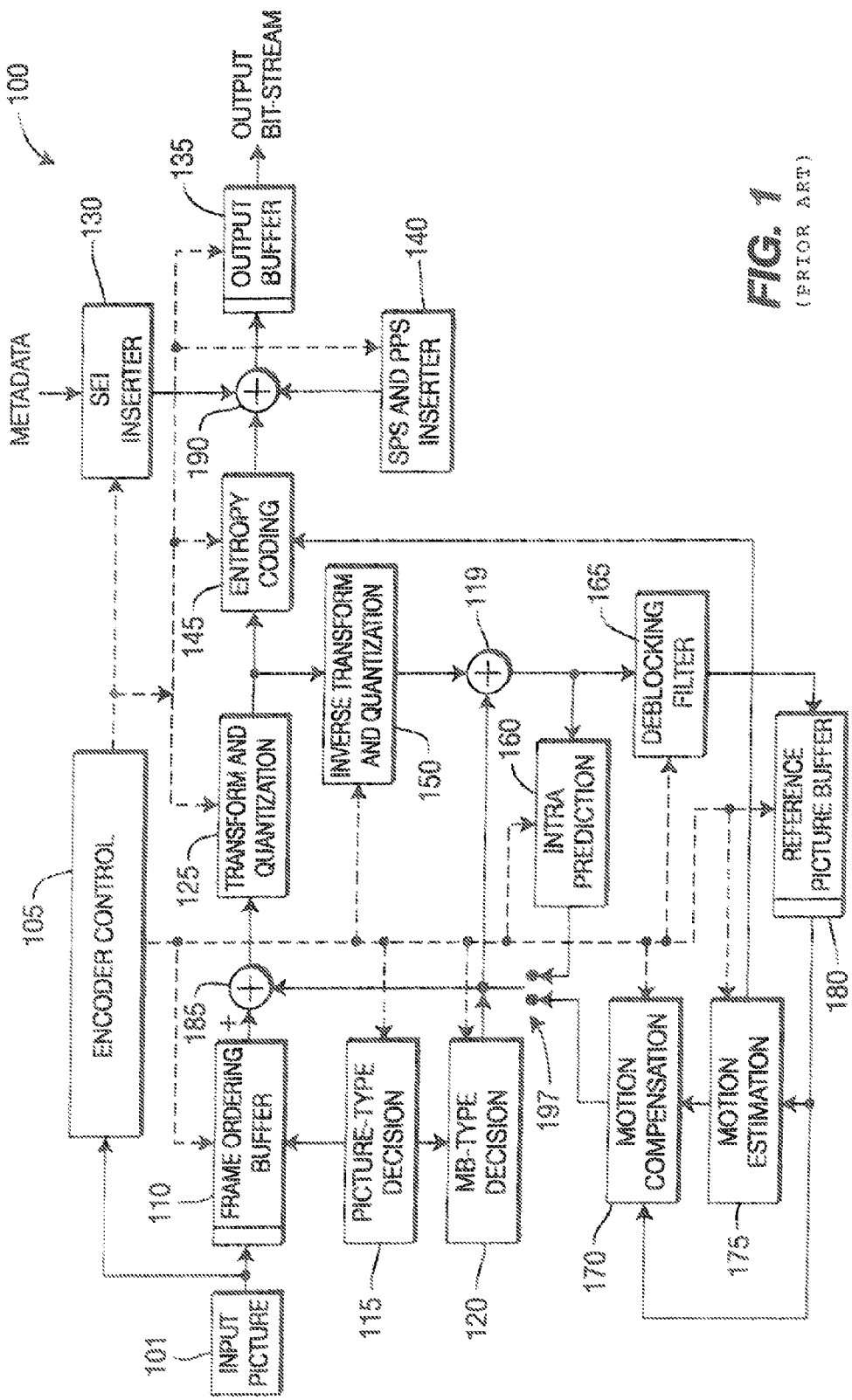
FIG. 1 shows a block diagram for a video encoder capable of performing video encoding in accordance with the MPEG-4 AVC Standard.
Figure 2:
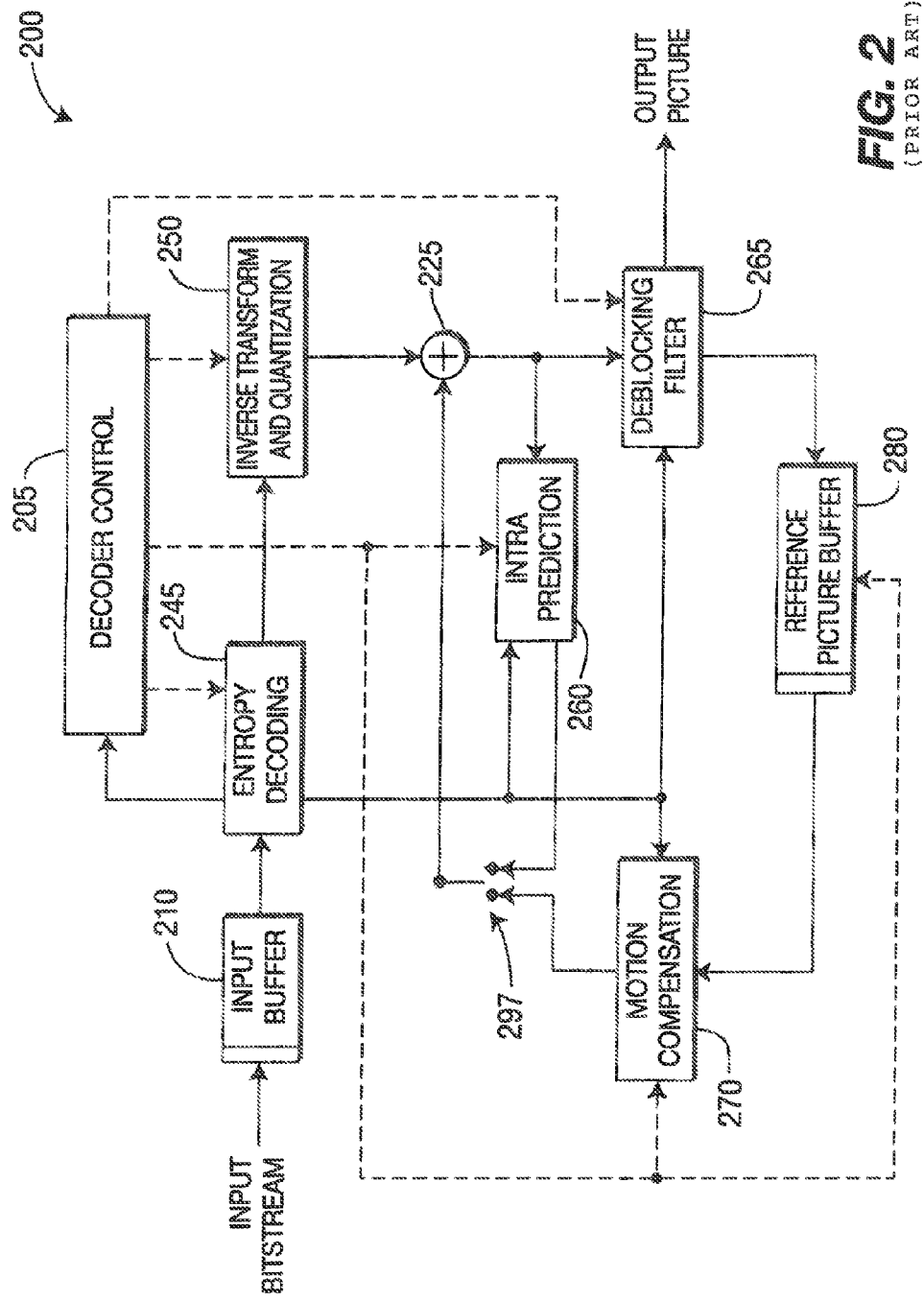
FIG. 2 shows a block diagram for a video decoder capable of performing video decoding in accordance with the MPEG-4 AVC Standard.

The present principles are directed to methods and apparatus for video coding using prediction data refinement.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

The phrase "image data" is intended to refer to data corresponding to any of still images and moving images (i.e., a sequence of images including motion).

The term "inpainting" refers to a technique that, using neighboring available data, estimates, interpolates and/or predicts data and/or components of data that are partially or totally missing in an image.

The phrase "sparsity based inpainting" refers to a particular embodiment of an "inpainting" technique where sparsity based principles are used to estimate, interpolate and/or predict data and/or components of data that are partially or totally missing in an image.

The phrases "causal data neighborhood" and "non-causal data neighborhood" respectively refer to a data neighborhood including previously processed data in a picture according to regular scanning order (e.g., raster-scan and/or zig-zag scan in the MPEG-4 AVC Standard), and to a data neighborhood comprising at least some data proceeding from regions located in a posterior position with respect to the current data according to a regular scanning order (e.g. raster-scan and/or zig-zag scan in H.264/AVC). An example of causal scanning order is provided with respect to FIG. 5A. An example of non-causal scanning order is provided with respect to FIG. 5B.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions such as multi-view (and non-multi-view) extensions of the MPEG-4 AVC standard, while maintaining the spirit of the present principles.

Further, it is to be appreciated that the present principles may be used with respect to any video coding strategy that uses prediction including, but not limited to, predictive video coding, multi-view video coding, scalable video coding, and so forth.

Figure 3:
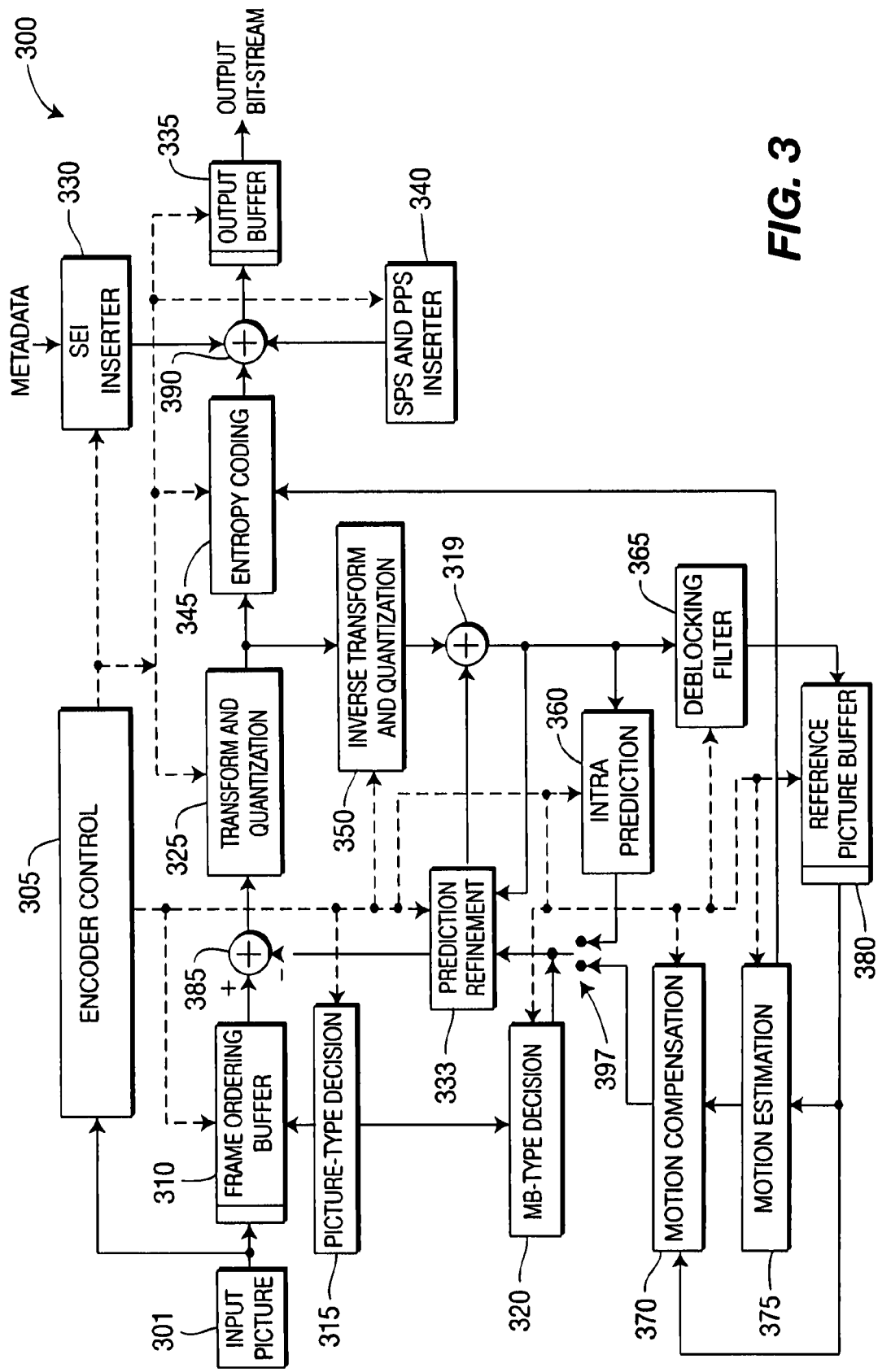
FIG. 3 shows a block diagram for a video encoder capable of performing video encoding in accordance with the MPEG-4 AVC Standard, modified and/or extended for use with the present principles, according to an embodiment of the present principles.

Turning to FIG. 3, a video encoder capable of performing video encoding in accordance with the MPEG-4 AVC standard, modified and/or extended for use with the present principles, is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, a second input of a reference picture buffer 380, and a first input of a prediction refinement filter 333.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360, a first input of the deblocking filter 365, and a second input of the prediction refinement filter 333. An output of the deblocking filter 365 is connected in signal communication with a first input of a reference picture buffer 380. An output of the reference picture buffer 380 is connected in signal communication with a second input of the motion estimator 375 and a third input of the Motion Compensation 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a third input of the prediction refinement filter 333. A first output of the prediction refinement filter 333 is connected in signal communication with a second non-inverting input of the combiner 319. A second output of the prediction refinement filter 333 is connected in signal communication with an inverting input of the combiner 385.

Inputs of the frame ordering buffer 310 and the encoder controller 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
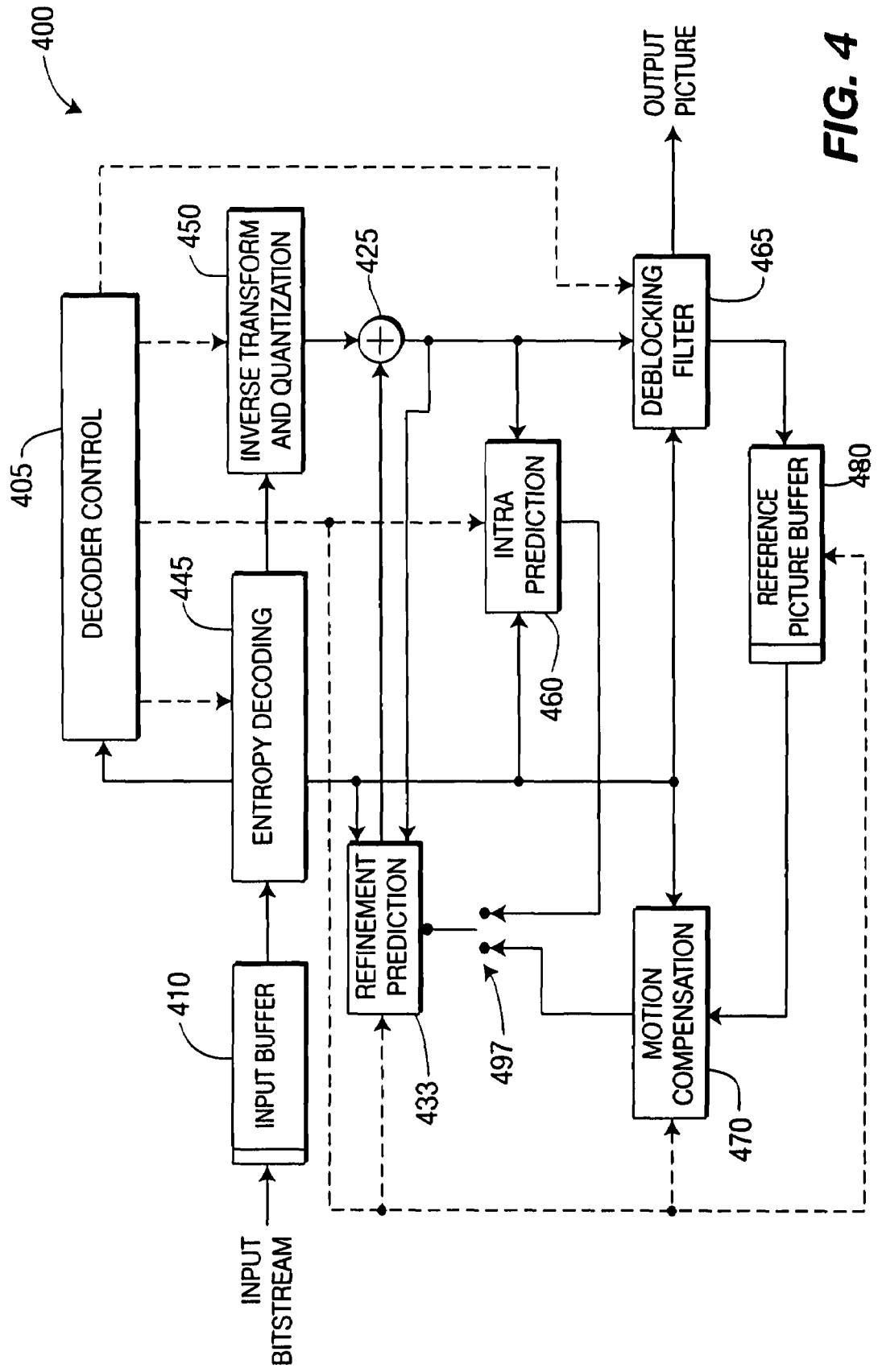
FIG. 4 shows a block diagram for a video decoder capable of performing video decoding in accordance with the MPEG-4 AVC Standard, modified and/or extended for use with the present principles, according to an embodiment of the present principles.

Turning to FIG. 4, a video decoder capable of performing video decoding in accordance with the MPEG-4 AVC standard, modified and/or extended for use with the present principles, is indicated generally by the reference numeral 400.

The video decoder 400 includes an input buffer 410 having an output connected in signal communication with a first input of the entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465, a first input of an intra prediction module 460, and a third input of a prediction refinement filter 433. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a fourth input of the prediction refinement filter 433. A third output of the entropy decoder 445 is connected in signal communication with an input a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, with a first input of the motion compensator 470, with a second input of the reference picture buffer 480, and with a first input of the prediction refinement filter 433.

An output of the motion compensator 470 is connected in signal communication with a first input of a switch 497. An output of the intra prediction module 460 is connected in signal communication with a second input of the switch 497. An output of the switch 497 is connected in signal communication with a second input of the prediction refinement filter 433. An output of the prediction refinement filter 433 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for video coding using prediction data refinement.

In an embodiment, an adaptive filter is used for predictive video coding and/or decoding. The adaptive filter may be implemented in the encoding and/or decoding loops to enhance and/or otherwise refine prediction data. In an embodiment, we apply the adaptive filter after the prediction stage and prior to the generation of an error residual.

In an embodiment, sparsity based inpainting techniques may be used in order to filter the data generated at the prediction step. In the event that any of the possible prediction modes generates a prediction that is sufficiently accurate (for example, per pre-defined criteria), a filter using already decoded data and applied to the selected prediction in accordance with an embodiment of the present principles can refine the predicted data such that a smaller residual error is generated, thus potentially reducing the amount of information required for residual coding and/or increasing the fidelity of the predicted data.

In the prior art of video coding, data predicted during the mode selection and prediction stage of a video encoder/decoder paradigm is used directly in the generation of the prediction residual. Also, the prior art in the recovery of missing image regions (e.g., inpainting) suggests that certain de-noising techniques can be used for such a purpose. Instead, in an embodiment of the present principles, we propose to use a filter on the predicted data in order to refine it further, previous to the generation of the prediction residual which can be a de-noising based technique for the recovery of partially missing data. In an embodiment, the proposed approach could be used to enhance/refine the prediction obtained from a prediction mode. In an embodiment, the use of a refining filter after prediction (and before the residual error is generated) is proposed for video coding algorithms.

The present principles make use of the fact that the decoded data available at the receiver (for example, from neighboring blocks, frames, and/or pictures) could be used to refine predicted data before the residual error is produced.

Intra Prediction Refinement

An embodiment (hereinafter "intra prediction embodiment") directed to intra prediction will now be described. It is to be appreciated that the intra prediction embodiment is described herein for the sake of illustration and, thus, it is to be appreciated that given the teachings of the present principles provided herein, one of ordinary skill in this and related arts will contemplate various modifications and variations of the present principles with respect to intra prediction, while maintaining the spirit of the present principles.

The proposed approach for intra prediction involves an in-loop intra-coding refinement process that improves the prediction accuracy of existing intra coding modes. Standard intra-coding methods, which are typically inherently low-pass operations, are generally unable to effectively predict high frequency content. In an embodiment, we refine an existing prediction, obtained through standard intra prediction, taking into account the samples on the surrounding blocks. In classic intra-prediction, as used in, for example, the MPEG-4 AVC Standard, only the first layer of pixels from neighboring blocks is used to compute pixels prediction in a current block. This implies that no information about the structure or texture of the signal in neighboring blocks is available for prediction. Hence, for example, one cannot predict the possible texture of the current block from such neighbor information or possible luminance gradients. In an embodiment, a higher number of pixels than those involved in a prediction corresponding to MPEG4 AVC Standard are used from surrounding (i.e., neighboring) blocks. This allows an improvement to the prediction in the current block as it is able to take into account, for example, information related to texture. As a consequence, the proposed intra prediction refinement procedure is able to enhance the prediction of high frequency or structured content in the current block.

The new intra-prediction refinement method inserts a refinement step between the prediction mode selection process and the computation of the residual error. On an intra-predicted macroblock, an embodiment of the present principles may involve the following steps:

(1) Perform intra-prediction using all intra-prediction modes available (e.g., 4×4, 8×8 and 16×16) and select the best intra-prediction mode (e.g., in a rate distortion sense).

(2) Use the prediction result to initialize a prediction refinement algorithm.

(3) Apply the prediction refinement algorithm.

(4) Determine whether or not the refinement process improves the prediction of the current block (e.g., in a rate distortion sense).

(5) If there is improvement, then the prediction obtained at the output of the refinement algorithm is used instead of the "classic" intra prediction from the MPEG-4 AVC Standard for that mode and block.

The necessary information regarding the intra-prediction refinement process could be transmitted to the decoder using, for example, a syntax which can be embedded at, for example, a sub-macroblock, macroblock or higher syntax level.

As an enhancement to the method described above, we adapt the refinement to the availability of neighboring decoded data. For example, in an embodiment directed to the MPEG-4 AVC Standard, the causal nature of decoded neighborhoods is taken into account. In the case of a 4×4 prediction mode, for example, the neighborhood used to refine the prediction of the current block is the causal neighborhood surrounding the current block (see FIG. 5B).

Turning to FIG. 5B, a diagram for a current intra 4×4 block being coded and the relevant neighborhood for inpainting is indicated generally by the reference numeral 500. In particular, the current 4×4 block is indicated by reference numeral 510, the relevant neighborhood blocks are indicated by the reference numerals 520, and the non-relevant neighborhood block is indicated by the reference numeral 530.

The prediction refinement approach may be described to include the following.

The prediction refinement approach involves determining and/or deriving a starting threshold $T_0$. This can be implicitly derived based on some statistics of the surrounding decoded data and/or pixels neighborhood and/or based on the coding quality or quantization step used during the coding process. Also, the starting threshold may be explicitly transmitted to the decoder using a syntax level. Indeed, a macroblock level or high level syntax may be used to place such information.

The prediction refinement approach also involves determining a final threshold $T_f$ and/or the maximum number of iterations to be performed on every block for a maximum refinement performance. The threshold and/or maximum number of iterations may be derived based on some statistics of the surrounding decoded neighborhood and/or based on the coding quality or quantization step used during the coding procedure. The final threshold may be transmitted to the decoder, for example, using a high level syntax. The high level syntax may be placed, for example, at a macroblock, a slice, a picture and/or a sequence level.

In an embodiment of the prediction refinement enabled video encoder and/or decoder, one can use a de-noising algorithm to perform prediction refinement. A particular embodiment of the prediction refinement filter may involve the following steps:

1) $T = T_0$.
2) Decompose the current block into L layers.
3) Initialize the layer pixels with the intra predicted values for the current block.
4) While $T > T_f$ and/or the number of iterations performed < maximum.
    a) For i = 1, ..., L (with L being the inner-most layer)
        i. Find all Discrete Cosine Transform (DCT) blocks that overlap layers i, ..., L by 50% or less, but not 0%
        ii. Hard threshold the coefficients using threshold T.
        iii. Inverse transform and update the pixels in layer i by averaging the over complete inverse transforms that overlap the relevant part of the layer.
    b) $T = T - \Delta T$.

This particular embodiment is iterative in nature. However, it is to be appreciated that other embodiments of the present principles may be implemented to run in a single iteration.

Thus, in an embodiment, image inpainting techniques are proposed for use as an in-loop refinement component for video compression applications. In an embodiment, a refinement step after prediction (and prior to residual error generation) is proposed for enhanced coding performance. In an embodiment, the use of de-noising-based inpainting techniques is proposed for such a prediction refinement.

Inter-Prediction Refinement

Given the teachings of the present principles provided herein, it is to be appreciated that the intra-prediction refinement approach described above is readily extended for use in inter-prediction refinement by one of ordinary skill in this and related arts, while maintaining the spirit of the present principles. It should be further appreciated that inter-prediction refinement may involve tuning of the refinement process depending on the Motion Compensated prediction mode and/or Motion Compensation (MC) prediction data (e.g. thresholds adaptation and/or iteration number setting and/or refinement enable) depending on the motion compensation modes and/or motion compensation data (motion vectors, reference frames) and their relation with neighboring blocks.

In an embodiment, the refinement step could be applied to inter data as a second pass refinement step on selected blocks or macroblocks after all macroblocks have followed a first encoding process. This can be considered when inter frames are coded. In an embodiment, during the second encoding pass, selected blocks, macroblocks and/or regions can use the additional step of prediction refinement using, if desired, a non-causal data neighborhood (see FIG. 5A). Turning to FIG. 5B, a diagram for a current intra 4×4 block being coded and the relevant non-causal neighborhood for inpainting is indicated generally by the reference numeral 550. In particular, the current 4×4 block is indicated by reference numeral 560, the relevant neighborhood blocks are indicated by the reference numerals 570.

The refinement step can be applied to any region shape or size of the picture, e.g. sub-blocks, macroblocks or to a compound region made of the union of sub-blocks and/or macroblocks. Then, the final residual error to be encoded is generated, taking into account the additional refinement step on the prediction.

An exemplary macroblock header in accordance with an embodiment of the present principles is shown in TABLE 1.

TABLE 1

| macroblock_layer( ) { | C | Descriptor |
|---|---|---|
| ... | | |
|   mb_type | 2 | ue(v)\|ae(v) |
| ... | | |
|   prediction_refinement_flag | | u(1) |
| if(prediction_refinement_flag && | | |
| mb_type==Intra4x4){ | | |
|     4x4subblock_level_adaptation_flag | | u(1) |
|     if(4x4subblock_level_adaptation_flag){ | | |
|       for (i=1; i<total_subblocks; i++){ | | |
|         4x4subblock_adaptation_flag[i] | | u(1) |
|       } | | |
|     } | | |
| } | | |
| ... | | |

Turning to FIG. 6, a method for encoding image data using prediction refinement is indicated generally by the reference numeral 600. In the particular example of FIG. 6, only macroblock-wise adaptivity for the use or not of prediction refinement is considered for the sake of simplicity.

The method 600 includes a start block 605 that passes control to a function block 610. The function block 610 performs intra prediction and selects the best intra prediction mode, records a measure of the distortion as D_intra, and passes control to a function block 615. The function block 615 performs a prediction refinement on intra predicted data, records the distortion measure as D_refinement, and passes control to a decision block 620. The decision block 620 determines whether or not D_refinement plus the addition of a measure of coding costs of intra mode (intra_cost) and refinement selection costs (refinement_cost) is less than D_intra plus the addition of a measure of coding costs of intra mode (intra_cost). If so, then control is passed to a function block 625. Otherwise, control is passed to a function block 630.

The function block 625 sets prediction_refinement_flag equal to one, and passes control to a function block 635.

The function block 630 sets prediction_refinement_flag equal to zero, and passes control to the function block 632.

The function block 632 discards the obtained refinement of the prediction, and passes control to the function block 635.

The function block 635 computes the residue and entropy codes the current macroblock, and passes control to an end block 699.

Figure 7:
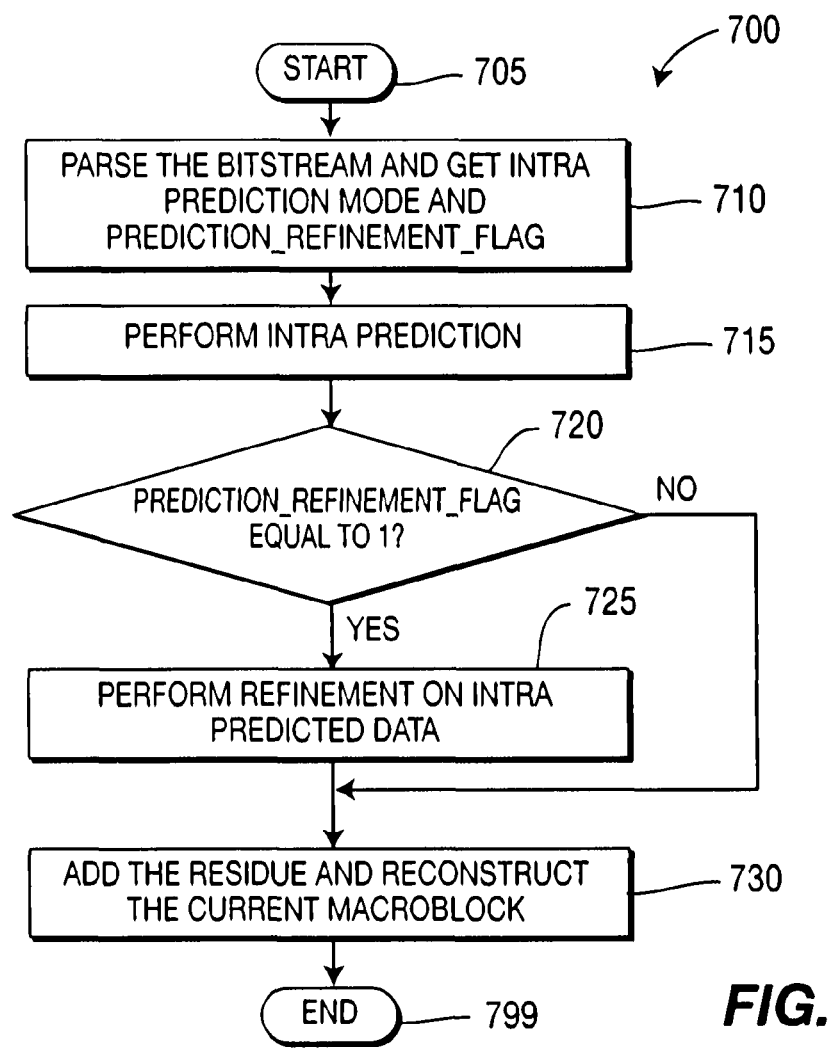
FIG. 7 shows a flow diagram for a method for decoding image data using prediction refinement, according to an embodiment of the present principles.

Turning to FIG. 7, a method for decoding image data using prediction refinement is indicated generally by the reference numeral 700.

The method 700 includes a start block 705 that passes control to a function block 710. The function block 710 parses the bitstream and gets (determines) an intra prediction mode and prediction_refinement_flag, and passes control to a function block 715. The function block 715 performs intra prediction, and passes control to a decision block 720. The decision block 720 determines whether or not prediction_refinement_flag is equal to one. If so, then control is passed to a function block 725. Otherwise, control is passed to a function block 730.

The function block 725 performs prediction refinement on intra predicted data, and passes control to the function block 730.

The function block 730 adds the residue and reconstructs the current macroblock, and passes control to an end block 799.

Figure 8:
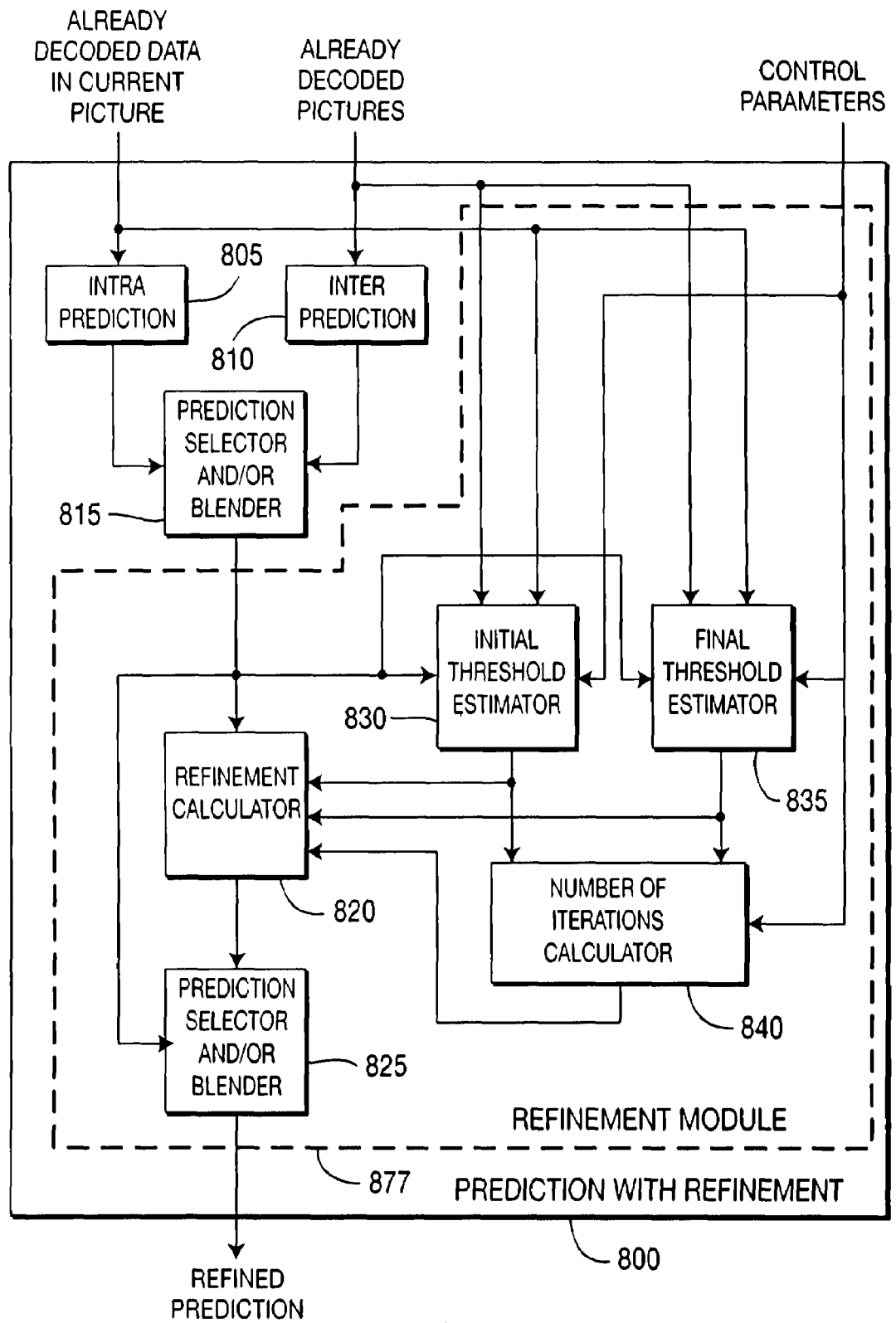
FIG. 8 shows a block diagram for an exemplary apparatus for providing a prediction with refinement, according to an embodiment of the present principles.

Turning to FIG. 8, an exemplary apparatus for providing a prediction with refinement is indicated generally by the reference numeral 800. The apparatus 800 may be implemented to include, for example, prediction refinement filter 333 and/or prediction refinement filter 433 of FIG. 3 and FIG. 4, respectively.

The apparatus 800 includes an intra-prediction module 805 having an output connected in signal communication with a first input of a prediction selector and/or blender 815. An output of the prediction selector and/or blender 815 is connected in signal communication with a first input of a refinement calculator 820, a first input of a prediction selector and/or blender 825, a first input of an initial threshold estimator 830, and a first input of a final threshold estimator 835. An output of the refinement calculator 820 is connected in signal communication with a second input of the prediction selector and/or blender 825.

An output of an inter prediction module 810 is connected in signal communication with a second input of the prediction selector and/or blender 815.

An output of the initial threshold estimator 830 is connected in signal communication with a second input of the refinement calculator 820 and a first input of a number of iterations calculator 840.

An output of the final threshold estimator 835 is connected in signal communication with a second input of the number of iterations calculator 840 and a third input of the refinement calculator 820.

An output of the number of iterations calculator 840 is connected in signal communication with a fourth input of the refinement calculator 820.

An input of the intra prediction module 805, an input of the initial threshold estimator 830, and an input of the final threshold estimator 835 are available as inputs of the apparatus 800, for receiving already decoded data in the current picture.

An input of the inter prediction module 810, the second input of the initial threshold estimator 830, and a second input of the final threshold estimator 835 are available as inputs of the apparatus 800, for receiving already decoded pictures.

A fourth input of the initial threshold estimator 830, a fourth input of the final threshold estimator 835, and a third input of the number of iterations calculator 840 are available as input of the apparatus 800, for receiving control parameters.

An output of the prediction selector and/or blender 825 is available as an output of the apparatus 800, for outputting a refined prediction.

The refinement calculator 820, the initial threshold estimator 830, the final threshold estimator 835, the number of iterations calculator 840, and the prediction selector and/or blender 825 are part of a refinement module 877 that, in turn, is part of the apparatus 800.

Figure 9:
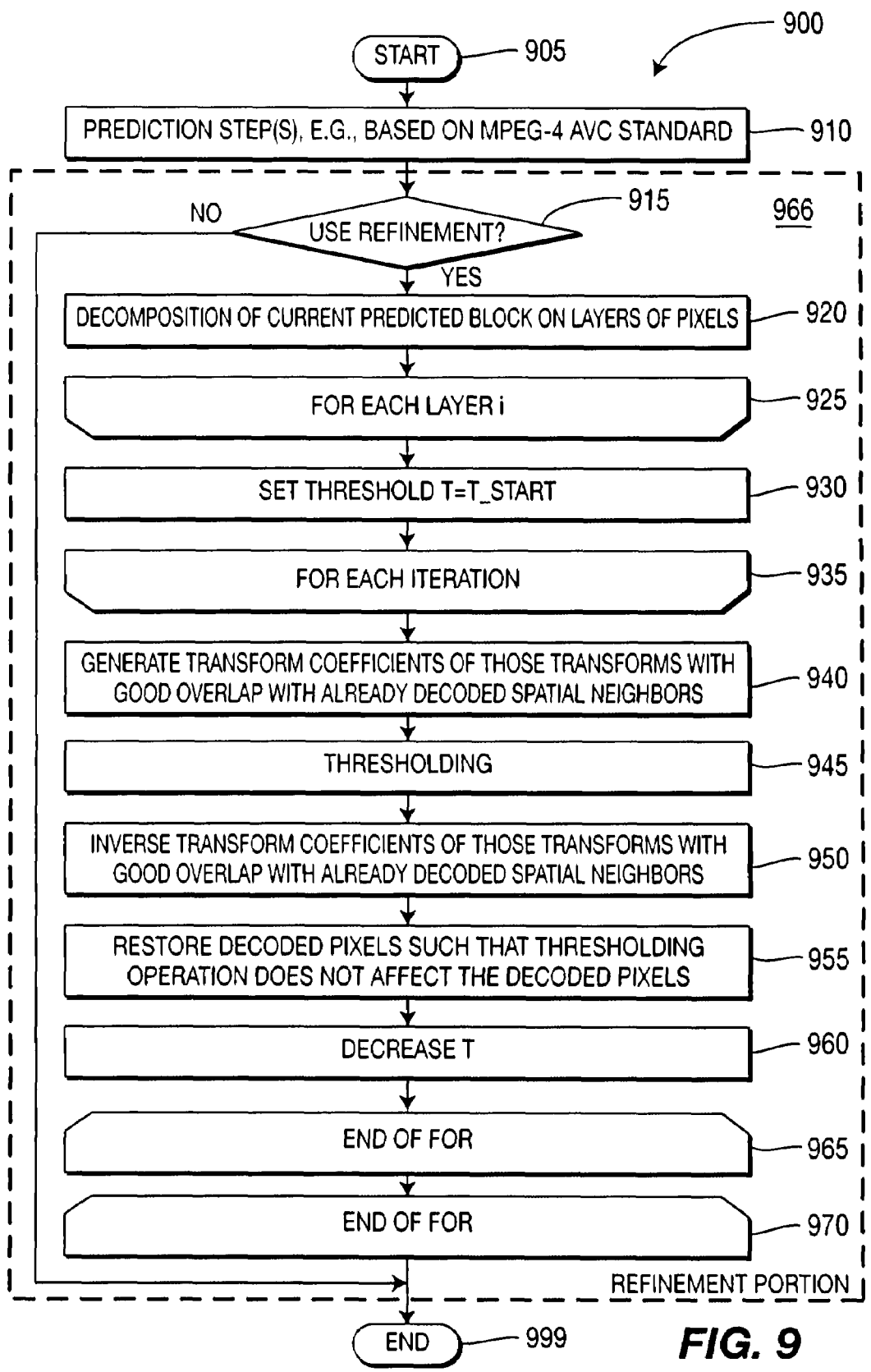
FIG. 9 shows a flow diagram for an exemplary method for generating a refined prediction, according to an embodiment of the present principles.

Turning to FIG. 9, an exemplary method for generating a refined prediction is indicated generally by the reference numeral 900. The method 900 may be considered to include a prediction portion represented by function block 910 and a refinement portion represented by blocks 915 through 970. The refinement portion is also indicated by the reference numeral 966.

The method 900 includes a start block 905 that passes control to a function block 910. The function block 910 performs a prediction step(s), for example, based on the MPEG-4 AVC Standard, and passes control to a decision block 915. The decision block 915 determines whether or not to use a refinement for the prediction. If so, then control is passed to a function block 920. Otherwise, control is passed to an end block 999.

The function block 920 performs a decomposition of the current predicted block on layers of pixels, and passes control to a loop limit block 925. The loop limit block 925 performs a loop over each layer I of the current block, and passes control to a function block 930. The function block 930 sets a threshold T equal to T_start, and passes control to a loop limit block 935. The loop limit block 935 performs a loop for each iteration, and passes control to a function block 940. The function block 940 generates transform coefficients of those transforms with good overlap (as used herein, "good overlap" refers to an overlap of at least 50%) with already decoded spatial neighbors, and passes control to a function block 945. The function block 945 performs a thresholding operation on the coefficients (e.g., keeping those coefficients which have an amplitude above a given threshold value, and setting to zero those that are below such the threshold value), and passes control to a function block 950. The function block 950 inverse transforms the thresholded coefficients of those transforms with good overlap with already decoded spatial neighbors, and passes control to a function block 955. The function block 955 restores the decoded pixels such that the thresholding operation does not affect the decoded pixels, and passes control to a function block 960. The function block 960 decreases the threshold T, and passes control to a loop limit block 965. The loop limit block 965 ends the loop over each iteration, and passes control to a loop limit block 970. The loop limit block 970 ends the loop over each layer i of the current predicted block, and passes control to the end block 999.

Figure 10:
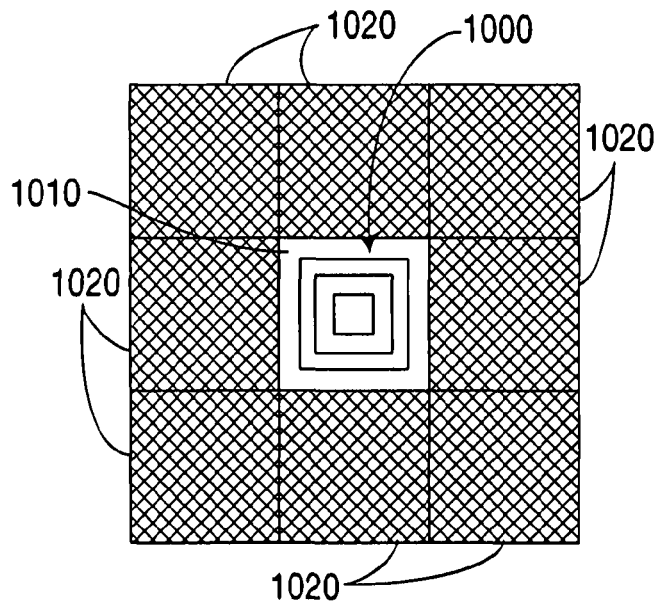
FIG. 10 shows a diagram for an exemplary set of concentric pixel layers in a macroblock under refinement, according to an embodiment of the present principles.

Turning to FIG. 10, an exemplary set of concentric pixel layers in a macroblock under refinement is indicated generally by the reference numeral 1000. The macroblock 1010 has a non-causal neighborhood of macroblocks 1020.

A description will now be given of some of the many attendant advantages/features of the present invention, some of which have been mentioned above. For example, one advantage/feature is an apparatus having an encoder for encoding an image region of a picture. The encoder has a prediction refinement filter for refining at least one of an intra prediction and an inter prediction for the image region. The prediction refinement filter refines the inter prediction for the image region using at least one of previously decoded data and previously encoded data, the previously decoded data and the previously encoded data corresponding to pixel values in neighboring regions with respect to the image region.

Another advantage/feature is the apparatus having the encoder with the prediction refinement filter as described above, wherein the image region is at least one of a block, a macroblock, a union of blocks, and a union of macroblocks.

Yet another advantage/feature is the apparatus having the encoder with the prediction refinement filter as described above, wherein the prediction refinement filter is at least one of a linear type and a non-linear type Still another advantage/feature is the apparatus having the encoder with the prediction refinement filter as described above, wherein the image region corresponds to any of multi-view video content for a same or similar scene, single-view video content, and a scalable layer from a set of scalable layers for the same scene.

Moreover, another advantage/feature is the apparatus having the encoder with the prediction refinement filter as described above, wherein the prediction refinement filter is applied with respect to an iterative noise reduction method and a non-iterative noise reduction method.

Further, another advantage/feature is the apparatus having the encoder with the prediction refinement filter as described above, wherein the prediction refinement filter is applied with respect to an iterative missing data estimation method and a non-iterative missing data estimation method.

Also, another advantage/feature is the apparatus having the encoder with the prediction refinement filter as described above, wherein the prediction refinement filter is adaptively enabled or disabled depending upon at least one of data characteristics and data statistics corresponding to at least one of the image region and neighboring regions.

Additionally, another advantage/feature is the apparatus having the encoder with the prediction refinement filter that is adaptively enabled or disabled as described above, wherein the at least one of data characteristics and data statistics comprise at least one of coding modes, motion data and residue data.

Moreover, another advantage/feature is the apparatus having the encoder with the prediction refinement filter that is adaptively enabled or disabled as described above, wherein enablement information or disablement information for the prediction refinement filter is determined such that at least one of a distortion measure and a coding cost measure is minimized.

Further, another advantage/feature is the apparatus having the encoder with the prediction refinement filter that is adaptively enabled or disabled as described above, wherein enablement information or disablement information for the prediction refinement filter is signaled using at least one of a sub-block level syntax element, a block level syntax element, a macroblock level syntax element, and high level syntax element.

Also, another advantage/feature is the apparatus having the encoder with the prediction refinement filter wherein enablement information or disablement information for the prediction refinement filter is signaled using at least one of a sub-block level syntax element, a block level syntax element, a macroblock level syntax element, and high level syntax element as described above, wherein the at least one high level syntax element is placed at least one of a slice header level, a Supplemental Enhancement Information (SEI) level, a picture parameter set level, a sequence parameter set level and a network abstraction layer unit header level.

Additionally, another advantage/feature is the apparatus having the encoder with the prediction refinement filter as described above, wherein the encoder transmits side information to adaptively indicate parameters of the prediction refinement filter corresponding to the image block, the side information being transmitted at least one of a sub-macroblock level, a macroblock level, a slice level, a picture level, and a sequence level.

Moreover, another advantage/feature is the apparatus having the encoder with the prediction refinement filter wherein the encoder transmits side information as described above, wherein the parameters of the prediction refinement filter are adaptively indicated based at least in part on at least one of data characteristics and data statistics corresponding to at least one of the image region and neighboring regions.

Further, another advantage/feature is the apparatus having the encoder with the prediction refinement filter, wherein the parameters of the prediction refinement filter are adaptively indicated as described above, wherein the at least one of data characteristics and data statistics comprise at least one of coding modes, motion data, reconstructed data, and residue data.

Also, another advantage/feature is the apparatus having the encoder with the prediction refinement filter as described above, wherein the prediction refinement filter is selectively applied in a second pass encoding of the picture without being applied in a first pass encoding of the picture.

Additionally, another advantage/feature is the apparatus having the encoder with the prediction refinement filter as described above, wherein the prediction refinement filter refines the intra prediction for the image region using at least one of previously decoded data and previously encoded data, the previously decoded data and the previously encoded data corresponding to pixel values in neighboring regions with respect to the image region.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   an encoder for encoding an image region of a picture, said encoder having a prediction refinement filter, operating in a coding loop on a prediction for an input image region and before a residual error is generated, for refining any of an intra prediction and an inter prediction for the image region,
   wherein said prediction refinement filter refines the inter prediction for the image region using at least one of previously decoded data and previously encoded data, the previously decoded data and the previously encoded data corresponding to pixel values in neighboring regions with respect to the image region,
   wherein said encoder further includes an inverse transformer and inverse quantizer unit and a combiner, the inverse transformer and inverse quantizer unit having an output directly connected to a first input of the combiner, the combiner having a second input directly connected to an output of the prediction refinement filter,
   wherein the encoder further comprises a deblocking filter, and an output of the combiner is directly connected to both an input of the prediction refinement filter and an input of the deblocking filter.

2. The apparatus of claim 1, wherein the image region corresponds to any of multi-view video content for a same or similar scene, single-view video content, and a scalable layer from a set of scalable layers for the same scene.

3. The apparatus of claim 1, wherein said prediction refinement filter is adaptively enabled or disabled depending upon at least one of data characteristics and data statistics corresponding to at least one of the image region and neighboring regions.

4. The apparatus of claim 3, wherein the at least one of data characteristics and data statistics comprise at least one of coding modes, motion data or residue data.

5. The apparatus of claim 1, wherein said prediction refinement filter is selectively applied in a second pass encoding of the picture without being applied in a first pass encoding of the picture.

6. A method, comprising:
   encoding an image region of a picture using a prediction refinement filter, operating in a coding loop on a prediction for an input image region and before a residual error is generated, to refine any of an intra prediction and an inter prediction for the image region,
   wherein said prediction refinement filter refines the inter prediction for the image region using at least one of previously decoded data and previously encoded data, the previously decoded data and the previously encoded data corresponding to pixel values in neighboring regions with respect to the image region,
   wherein said encoding step is performed in an encoder that includes the prediction refinement filter, the encoder further including an inverse transformer and inverse quantizer unit and a combiner, the inverse transformer and inverse quantizer unit having an output directly connected to a first input of the combiner, the combiner having a second input directly connected to an output of the prediction refinement filter,
   wherein the encoder further comprises a deblocking filter, and an output of the combiner is directly connected to both an input of the prediction refinement filter and an input of the deblocking filter.

7. The method of claim 6, wherein the image block corresponds to any of multi-view video content for a same or similar scene, single-view video content, and a scalable layer from a set of scalable layers for the same scene.

8. The method of claim 6, wherein the prediction refinement filter is adaptively enabled or disabled depending upon at least one of data characteristics and data statistics corresponding to the image block.

9. The method of claim 8, wherein the at least one of data characteristics and data statistics comprise at least one of coding modes, motion data or residue data.

10. The method of claim 6, wherein the prediction refinement filter is selectively applied in a second pass encoding of the picture without being applied in a first pass encoding of the picture.

11. An apparatus, comprising:
    a decoder for decoding an image region of a picture, said decoder having a prediction refinement filter, operating in a decoding loop on a prediction for an input image region and before a residual error is generated, for refining any of an intra prediction and an inter prediction for the image region,
    wherein said prediction refinement filter refines the inter prediction for the image region using previously decoded data corresponding to pixel values in neighboring regions with respect to the image region,
    wherein said decoder further includes an inverse transformer and inverse quantizer unit and a combiner, the inverse transformer and inverse quantizer unit having an output directly connected to a first input of the combiner, the combiner having a second input directly connected to an output of the prediction refinement filter,
    wherein the decoder further comprises a deblocking filter, and an output of the combiner is directly connected to both an input of the prediction refinement filter and an input of the deblocking filter.

12. The apparatus of claim 11, wherein said prediction refinement filter is adaptively enabled or disabled depending upon at least one of data characteristics and data statistics corresponding to the image block.

13. The apparatus of claim 12, wherein enablement information or disablement information for said prediction refinement filter is decoded from at least one high level syntax element.

14. The apparatus of claim 13, wherein the at least one high level syntax element is located at at least one of a slice header level, a Supplemental Enhancement Information (SEI) level, a picture parameter set level, a sequence parameter set level and a network abstraction layer unit header level.

15. The apparatus of claim 11, wherein said prediction refinement filter refines the intra prediction for the image region using at least one of previously decoded data and previously encoded data, the previously decoded data and the previously encoded data corresponding to pixel values in neighboring regions with respect to the image region.

16. A method, comprising:
  decoding an image region of a picture using a prediction refinement filter, operating in a decoding loop on a prediction for an input image region and before a residual error is generated, to refine any of an intra prediction and an inter prediction for the image region,
  wherein said prediction refinement filter refines the inter prediction for the image region using previously decoded data corresponding to pixel values in neighboring regions with respect to the image region,
  wherein said decoding step is performed in a decoder that includes the prediction refinement filter, the decoder further including an inverse transformer and inverse quantizer unit and a combiner, the inverse transformer and inverse quantizer unit having an output directly connected to a first input of the combiner, the combiner having a second input directly connected to an output of the prediction refinement filter,
  wherein the decoder further comprises a deblocking filter, and an output of the combiner is directly connected to both an input of the prediction refinement filter and an input of the deblocking filter.

17. The method of claim 16, wherein the prediction refinement filter is applied with respect to an iterative missing data estimation method and a non-iterative missing data estimation method.

18. The method of claim 16, wherein the prediction refinement filter is adaptively enabled or disabled depending upon at least one of data characteristics and data statistics corresponding to the image block.

19. The method of claim 18, wherein the at least one of data characteristics and data statistics comprise at least one of coding modes, motion data or residue data.

20. The method of claim 16, wherein said decoding step further comprises decoding side information to adaptively determine parameters of the prediction refinement filter corresponding to the image block, the side information being decoded from at least one of a macroblock level, a slice level, a picture level, and a sequence level.

21. A non-transitory storage media readable by a machine and having executable instructions encoded thereupon to perform an encoding method, the method steps comprising:
  encoding an image region of a picture using a prediction refinement filter, operating in a coding loop on a prediction for an input image region and before a residual error is generated, to refine any of an intra prediction and an inter prediction for the image region,
  wherein said prediction refinement filter refines the inter prediction for the image region using at least one of previously decoded data and previously encoded data, the previously decoded data and the previously encoded data corresponding to pixel values in neighboring regions with respect to the image region,
  wherein said encoding step is performed in an encoder that includes the prediction refinement filter, the encoder further including an inverse transformer and inverse quantizer unit and a combiner, the inverse transformer and inverse quantizer unit having an output directly connected to a first input of the combiner, the combiner having a second input directly connected to an output of the prediction refinement filter,
  wherein the encoder further comprises a deblocking filter, and an output of the combiner is directly connected to both an input of the prediction refinement filter and an input of the deblocking filter.

22. The non-transitory storage media of claim 21, wherein the image region is at least one of a block, a macroblock, a union of blocks, and a union of macroblocks.

23. The non-transitory storage media of claim 21, wherein the image region corresponds to any of multi-view video content for a same or similar scene, single-view video content, and a scalable layer from a set of scalable layers for the same scene.

24. The non-transitory storage media of claim 23, wherein the at least one of data characteristics and data statistics comprise at least one of coding modes, motion data or residue data.

25. The non-transitory storage media of claim 23, wherein enablement information or disablement information for said prediction refinement filter is determined such that at least one of a distortion measure and a coding cost measure is minimized.

26. The apparatus of claim 1, wherein the prediction refinement filter comprises a first input and a second input, and the apparatus further comprises:
  an intra prediction module having an output connected to the first input of the prediction refinement filter for providing the intra prediction thereto; and
  a motion compensator having an output connected to the second input of the prediction refinement filter for providing the inter prediction thereto.

27. The method of claim 6, further comprising providing an encoder to perform said encoding step, said encoder comprising the prediction refinement filter having a first input and a second input, an intra prediction module having an output connected to the first input of the prediction refinement filter for providing the intra prediction thereto, and a motion compensator having an output connected to the second input of the prediction refinement filter for providing the inter prediction thereto.

28. The apparatus of claim 11, wherein the prediction refinement filter comprises a first input and a second input, and the apparatus further comprises:
  an intra prediction module having an output connected to the first input of the prediction refinement filter for providing the intra prediction thereto; and
  a motion compensator having an output connected to the second input of the prediction refinement filter for providing the inter prediction thereto.

29. The method of claim 16, further comprising providing a decoder to perform said decoding step, said decoder comprising the prediction refinement filter having a first input and a second input, an intra prediction module having an output connected to the first input of the prediction refinement filter for providing the intra prediction thereto, and a motion compensator having an output connected to the second input of the prediction refinement filter for providing the inter prediction thereto.

30. The non-transitory storage media of claim 21, wherein the image region is encoded by an encoder, the encoder comprising the prediction refinement filter having a first input and a second input, an intra prediction module having an output connected to the first input of the prediction refinement filter for providing the intra prediction thereto, and a motion compensator having an output connected to the second input of the prediction refinement filter for providing the inter prediction thereto.

* * * * *